(12) United States Patent
Kitamura et al.

(10) Patent No.: US 7,570,446 B2
(45) Date of Patent: Aug. 4, 2009

(54) DISK DRIVE WITH IMPROVED FORMAT EFFICIENCY AND CONTROL METHOD THEREOF

(75) Inventors: Nobuhito Kitamura, Kanagawa (JP); Hitoshi Yoshida, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 415 days.

(21) Appl. No.: 11/294,996

(22) Filed: Dec. 5, 2005

(65) Prior Publication Data

US 2006/0126208 A1 Jun. 15, 2006

(30) Foreign Application Priority Data

Dec. 9, 2004 (JP) ............................. 2004-357001

(51) Int. Cl.
*G11B 5/09* (2006.01)
(52) U.S. Cl. .................... 360/51; 360/31; 360/75; 360/76; 360/78.04
(58) Field of Classification Search .................... 360/48, 360/51, 53, 77.08
See application file for complete search history.

(56) References Cited

U.S. PATENT DOCUMENTS

| | | | | |
|---|---|---|---|---|
| 5,600,501 | A * | 2/1997 | Yamakoshi et al. | 360/51 |
| 5,796,534 | A * | 8/1998 | Yamamoto et al. | 360/48 |
| 6,005,751 | A * | 12/1999 | Kazmierczak et al. | 360/244 |
| 6,141,164 | A * | 10/2000 | Ishibashi et al. | 360/53 |
| 6,185,059 | B1 * | 2/2001 | Buch et al. | 360/51 |
| 6,577,462 | B1 * | 6/2003 | Hamada et al. | 360/51 |
| 6,781,786 | B2 * | 8/2004 | Ishii | 360/78.04 |
| 7,006,316 | B1 * | 2/2006 | Sargenti et al. | 360/51 |
| 7,106,534 | B2 * | 9/2006 | Yoshida et al. | 360/51 |
| 7,298,573 | B2 * | 11/2007 | Kitamura et al. | 360/75 |
| 2003/0002190 | A1 * | 1/2003 | Teo et al. | 360/63 |
| 2003/0156347 | A1 * | 8/2003 | Ishii | 360/78.04 |
| 2004/0190174 | A1 * | 9/2004 | Yoshida et al. | 360/51 |
| 2006/0056093 | A1 * | 3/2006 | Ehrlich et al. | 360/75 |

FOREIGN PATENT DOCUMENTS

JP 09-198818 7/1997

\* cited by examiner

*Primary Examiner*—Hoa T Nguyen
*Assistant Examiner*—Dismery E Mercedes
(74) *Attorney, Agent, or Firm*—Townsend and Townsend and Crew LLP; Patrick Duncan

(57) ABSTRACT

Embodiments of the invention provide a magnetic disk drive and its control method capable of effectively using the unrecordable area which is caused due to the composite magnetic head's gap between the read head and the write head. In one embodiment, a disk drive comprises a composite magnetic head structured in such a manner that during write the write head WH reaches each servo area earlier than the read head RH, and a read write control unit to control the write and read done by the composite magnetic head. On the disk, common servo data SP to be used both during read and during write, write servo data SW to be used during write and read servo data SR to be used during read are recorded in this order in each servo area. During write, the read write control unit starts the write head recording data at the timing when reading write servo data SW from the servo area is completed.

21 Claims, 8 Drawing Sheets

(a)

(b)

DISK DRIVE WITH IMPROVED FORMAT EFFICIENCY AND CONTROL METHOD THEREOF

CROSS-REFERENCES TO RELATED APPLICATIONS

This application claims priority from Japanese Patent Application No. JP2004-357001, filed Dec. 9, 2004, the entire disclosure of which is incorporated herein by reference.

BACKGROUND OF THE INVENTION

The present invention relates to a disk drive having a composite head. In particular, the invention relates to a disk drive where data is recorded with improved format efficiency on a disk.

As information recording and reproducing apparatus, there have been known various apparatus using optical disks, magnetic tapes and other types of media. Among them, the hard disk drive (HDD) is popular as a storage device for computers so widely that it is one of the storage devices indispensable for today's computer systems. Further, not limited to computers, the hard disk drive is increasingly enlarging its area of application due to its superior characteristics including moving picture recording and reproducing apparatus and removable memories used in car navigation systems, digital cameras, etc.

Typically, a HDD comprises a magnetic disk on which tracks are formed according to servo data recorded by a servo writer or the like. That is, servo data is recorded as shown in FIG. 8(a) so that concentric tracks are followed. The servo data is recorded in a plurality of areas on each track. This servo data comprises such known fields as a Sync field D1 where Sync data is recorded to synchronize data, a STM (Servo track mark) field D2 where a servo mark to indicate the start of the servo data is recorded, a track ID field D3 where position information indicating the number of the track, etc. is recorded and a Burst field D4 where burst patterns are recorded for performing fine position control. The Sync field D1 includes a servo AGC (Automatic Gain Control) used, before retrieving the servo data, to adjust the gain of the signal amplifier to regulate the amplitude to a certain magnitude.

For example, four types of burst patterns are recorded in the Burst field D4 as shown in FIG. 8(b). These burst patterns A, B, C and D are retrieved by the head. Changes of their read signals (burst signals) in amplitude and others are digitized to be used for such purposes as head tracking control (track following).

Here, Tc, Th and Tw are used to respectively denote the center, boundary and width of a track as shown in FIG. 8(b). Either burst A or burst B is recorded between the Tc of one track and that of one of its adjacent tracks and this is alternately repeated at a certain period. Either burst C or burst D is recorded in one track and this is alternately repeated at a certain period. The circumferential length of each of these recorded bursts A through D is about ten cycles. The read head RH is controlled to a track center Tc where the read signal amplitude of burst A should be balanced with that of burst B. The position error of the head can be corrected from an error signal obtained by, for example, adding the amplitude of burst A to that of burst B or subtracting the former from the latter. Note that bursts A through B are not necessarily recorded as shown in FIG. 8(b). They may be recorded in a different order.

A servo data-recorded area (hereinafter denoted as a servo area) is set intermittently at equal intervals along concentric tracks on the magnetic disk medium. An area where PLL (Phase Locked Loop), user data, etc. are recorded (hereinafter denoted as a data recording area) is set between servo areas.

Each data recording area includes a plurality of data sectors and a gap portion. The gap portion is a space to absorb the disk's rotational fluctuations and the electronic circuit's delay. Data is not recorded in the gap portion. To raise the track format efficiency, it is preferable to enlarge each data recording area by reducing this non-data gap portion. Although the simplest method to raise the format efficiency is to reduce the servo area's share, it is difficult to reduce the share since the servo area contains head positioning information as mentioned above. Thus, various methods have so far been proposed to reduce the non-data portion instead of the servo area's share. For example, Patent Document 1 (Japanese Patent Laid-Open No. 11-3565) listed below discloses a technique which controls the sector pulse timing either during write or read so as to eliminate this non-data portion in order to enlarge the effective data recording areas on the disk.

In the meantime, in the field of magnetic disk drives represented by HDDs, the perpendicular magnetic recording system is recently under development. As compared with the longitudinal recording system in which magnetization is recorded in a direction parallel to tracks in a disk surface, the perpendicular recording system can make smaller the recorded magnetism transition interval and consequently raise the recording density. This perpendicular magnetic recording system can realize high areal recording densities since the signal amplitude attenuation at high linear recording densities is small due to the relatively high signal resolution.

In longitudinal recording magnetic disk drives, the head comprises a write element (write head) to transduce electric signal to magnetic field according to the write data for the magnetic disk and a magnetoresistive (MR) element or giant magnetoresistive (GMR) element to transduce magnetic field from the magnetic disk to electric signal. Typically, a composite magnetic head is used which has a write head and a read head formed integrally in a single thin-film device. Such a composite magnetic head has a gap between the write head and the read head in the circumferential direction (hereinafter denoted as the head gap).

In the case of the composite magnetic head for perpendicular recording, its basic structure comprises a MR or GMR element-used read head and a single-pole inductive-type thin-film head (write head) which are formed on a slider apart from each other as well. However, its head gap between the read head and write head in the circumferential direction of the disk is about 7 to 8 µm, larger than the head gap about 3 to 4 µm of the longitudinal recording composite head. See Patent Document 2 (Japanese Patent Laid-Open No. 2003-291701).

In a disk drive where such a composite magnetic head is used, it is necessary to adjust the read head's read operation timing and the write head's write operating timing.

Executing a write operation in a data recording area by the write head forms a gap portion to absorb rotational fluctuation, followed by a PLL synchronization signal (PLL) recorded. This PLL is a synchronization signal to synchronize the read clock with the data. The read clock is used for read (retrieve) operation. Then, user data is recorded after a synchronization byte (sync byte) is recorded to indicate the start of the user data.

Since the perpendicular recording composite head has a large head gap, it is necessary to enlarge the gap portion in order to absorb rotational fluctuation. However, enlarging the gap portion lowers the data format efficiency. Accordingly, a magnetic disk drive described in Patent Document 2 is provided with a read/write gate generator circuit capable of adjusting the output timings of the write gate WG and read gate RG based on the head gap and the data format in order to prevent the data format efficiency from deteriorating due to the head gap.

BRIEF SUMMARY OF THE INVENTION

In the case of a composite magnetic head, given the format of the magnetic disk, this head gap must be taken into consideration in the arrangement of each servo area and the adjacent data recording area including the PLL field. That is, some area is inevitably left as a recording impossible area (hereinafter denoted as an unrecordable area) due to this head gap. In terms of the format efficiency, it is preferable to reduce this unrecordable area as well as the above-mentioned gap portion.

However, in the case of the aforementioned Patent Document 1, the format loss portion (unrecordable area) caused due to the head gap cannot be effectively utilized although the format efficiency for the PLL field of the data recording area can be somewhat raised by removing the gap portion. Also in the case of Patent Document 2, the unrecordable area attributable to the head gap cannot be effectively utilized although it is possible to prevent the data format efficiency from deteriorating due to the gap which is introduced in order to absorb rotational fluctuation.

The present invention has been made in order to solve the above-mentioned problem. It is a feature of the present invention to provide a disk drive and its control method capable of effectively utilizing an unrecordable area which is caused due to a composite magnetic head's gap between the read head and the write head. It is another feature of the present invention to provide a disk drive and its control method capable of reducing the unrecordable area which is caused due to the composite magnetic head's gap between the read head and the write head.

A disk drive according to an aspect of the present invention comprises: a head provided with a write head to record data on a disk and a read head to read data recorded on the disk; and a read write control unit which controls the write and read done by the head; wherein: the disk has servo areas in each of which common servo data to be used both during write and during read and read servo data to be used during read are recorded; the head is structured in such a manner that the write head reaches each servo area earlier than the read head when data is recorded in data recording areas each of which are arranged between adjacent servo areas; and the read write control unit starts the write head recording data in a data recording area before the read head retrieves read servo data from the servo area.

According to the present invention, when recording data in a data recording area between servo areas by using the head which is structured in such a manner that the write head reaches each servo area earlier than the read head, it is possible to start the write head recording data without retrieving read servo data recorded in the servo area.

Common servo data and read servo data are recorded in each servo area in such a manner that the read servo data is retrieved after the common servo data. It is therefore possible to start the write head recording data without retrieving read servo data recorded in the servo area.

Write servo data to be necessary during write is also recorded in each servo area in such a manner that the common servo data, the write servo data and the read servo data are retrieved in this order. It is therefore possible during a write operation to start the write head after retrieving only the write servo data without retrieving the read servo data which is not required during write.

In this case, the gap between the write head and the read head in the circumferential direction of the disk is larger than the circumferential width of each area where read servo data is recorded. It is therefore possible to place read servo data in the unrecordable area to be formed due to the head gap.

A write servo gate used during write to control the timing of retrieving servo data recorded in each servo area and a write servo gate used during read to control the timing of retrieving servo data recorded in each servo area are individually generated by the read write control unit. The read head can be therefore controlled so as to retrieve servo data only during the read operation.

The read write control unit generates a write gate in such a manner that data recording in each data area is started at the timing when the common data or the write servo data is completely retrieved. It is therefore possible to raise the format efficiency.

A disk drive according to another aspect of the present invention comprises: a disk having servo areas in each of which common servo data to be used both during write and during read is recorded; a write head to record data signal in data recording areas on the disk; a read head which is provided circumferentially apart from the write head to retrieve data signal recorded in data recording areas on the disk; and a read write control unit which controls the write and read done by the heads; wherein: on the disk, read servo data to be used at least during read is provided in each servo area between the common servo data and the adjacent data area so that the read servo data is retrieved by the read head later than the common servo data; and the read write control unit starts the write head recording data in a data recording area before the read head retrieves read servo data from the servo area.

According to the present invention, by starting the write head recording data in a data recording area after common servo data is retrieved but before read servo data is retrieved, it is possible to raise the data recording efficiency in a disk drive having a head gap between the read head and the write head.

A disk control method according to another aspect of the present invention is for a disk drive having a write head to record data in data recording areas on a disk and a read head to retrieve data recorded in data recording areas on the disk and a read write control unit to control the write and read done by the heads. The control method comprises: allowing the read head to read common servo data from the disk in which in each of servo areas arranged thereon, the common servo data to be used both during write and during read and read servo data to be used during read are recorded in such a manner that the common servo data is read out earlier than the read servo data; and allowing the write head to start data recording in each data recording area before the read servo data is retrieved.

According to the present invention, in a disk drive where common servo data and read servo data are recorded in each servo area in advance in such a manner that the common servo data can be read earlier than the read servo data, it is possible to raise the data recording efficiency by starting data recording without reading the read servo data.

A disk drive and its control method according to the present invention can effectively use the unrecordable area which is attributable to composite head's gap between the read head and the write head. In addition, it is possible to reduce the unrecordable area which is attributable to the composite head's gap between the read head and the write head.

DETAILED DESCRIPTION OF THE INVENTION

With reference to the drawings, the following will provide a detailed description of a specific embodiment of the present invention. This embodiment is obtained by applying the present invention to a HDD or a magnetic disk drive that includes a composite magnetic head.

Figure 1:
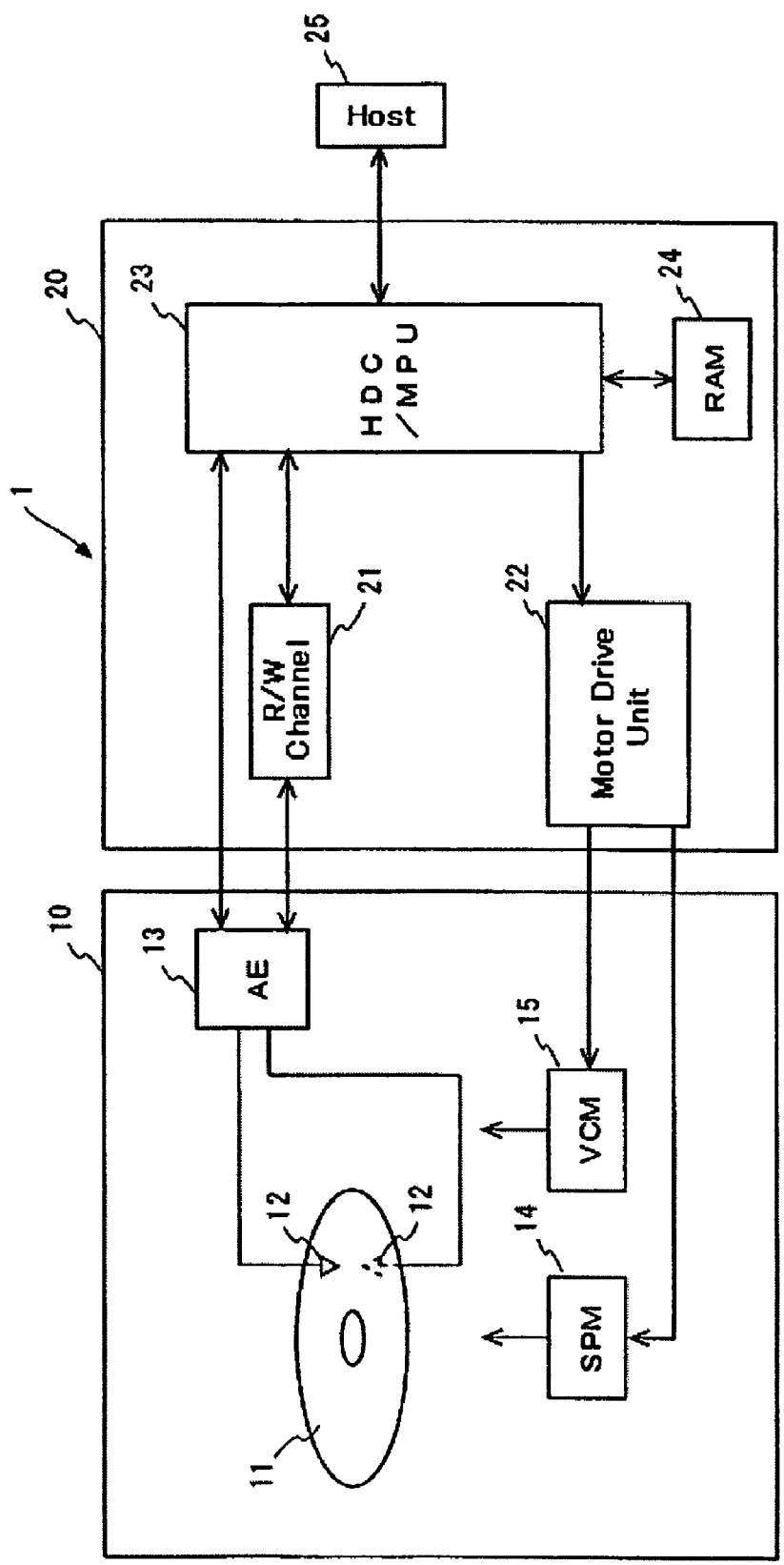
FIG. 1 is a block diagram which schematically shows the configuration of a HDD according to an embodiment of the present invention.

FIG. 1 is a block diagram which schematically shows the configuration of a HDD 1 of the embodiment. As shown in FIG. 1, the HDD 1 has a magnetic disk 11 which is an example of a medium, heads 12, an arm electronics (AE) 13, a spindle motor (SPM) 14 and a voice coil motor (VCM) 15 in a sealed enclosure 10.

In addition, the HDD 1 has a circuit board 20 fixed to the outside of the enclosure 10. The circuit board 20 is provided with such ICs as a read/write channel (R/W channel) 21, a motor driver unit 22, a hard disk controller (HDC)/MPU integrated circuit (hereinafter HDC/MPU) 23 and a RAM 24 as an example of memory. Note that each circuit may be integrated either in a single IC or across a plurality of separate ICs.

Write data from an external host 25 is received by the HDC/MPU 23 and written onto the magnetic disk 11 by the heads 12 via the R/W channel 21 and the AE 13. In addition, data stored on the magnetic disk 11 is read out by the heads 12 and output to the external host 25 from the HDC/MPU 23 via the AE 13 and the R/W channel 21.

Figure 2:
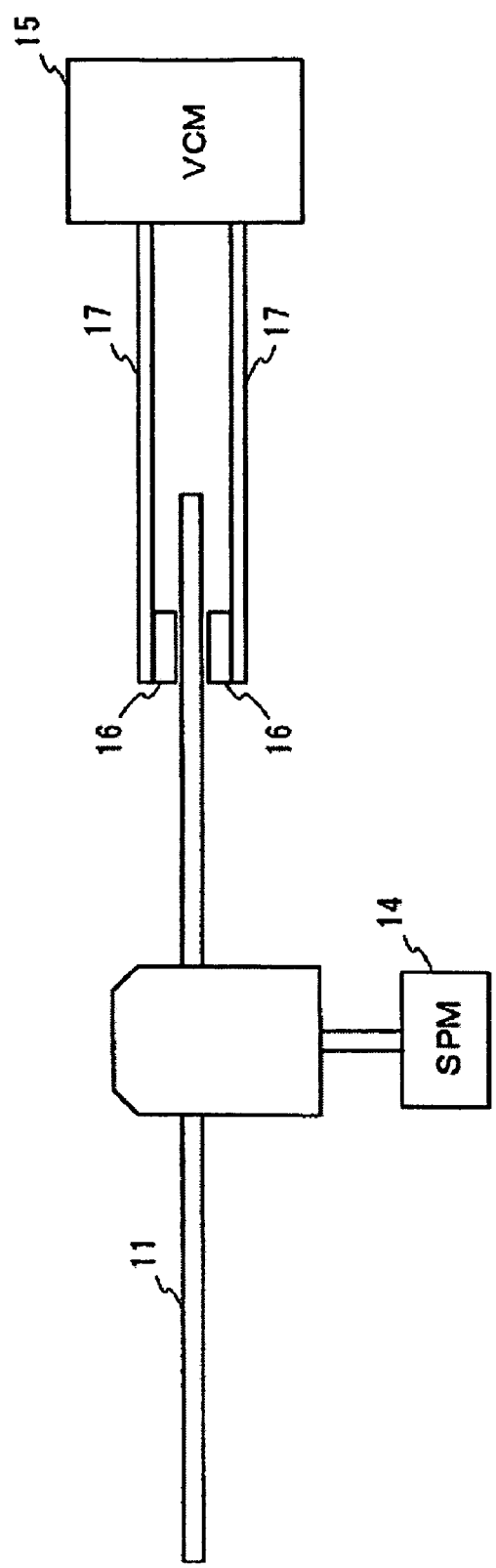
FIG. 2 schematically shows the magnetic disk drive mechanism and the head element drive mechanism in the embodiment of the present invention.

Below, individual components of the HDD 1 are described. Firstly, referring to FIG. 2, the following provides a general description of how the magnetic disk 11 and the heads 12 are driven. The magnetic disk 11 is fixed to the hub of the SPM 14. The SPM 14 rotates the magnetic disk at a given speed. According to control data from the HDC/MPU 23, the motor driver unit 22 drives the SPM 14. The magnetic disk 11 in this embodiment has a data recording surface on each side. Each recording surface is associated with a head 12 (see FIG. 1).

Each head 12 (see FIG. 1) is fixed to a slider 16. The slider 16 is fixed to a carriage 17. The carriage 17 is fixed to the VCM 15. The carriage 17 is pivotally moved by the VCM 15 to move the slider 16 and the head 12. The motor driver unit 22 drives the VCM 15 according to control data from the HDC/MPU 23.

To read/write data on the magnetic disk 11, the carriage 17 moves the slider 16 and the head 12 to a data area in the surface of the rotating magnetic disk 11. As the carriage 17 pivotally moves, the slider 16 and the head 12 move in the radial direction of the magnetic disk 11. This allows the head 12 to access a desired area.

Air between the rotating magnetic disk 11 and the ABS (Air Bearing Surface) of the slider 16 facing the magnetic disk 11 causes a pressure due to its viscosity. As a result of this pressure balanced with a force given by the carriage 17 toward the magnetic disk 11, the head 12 flies above the magnetic disk 11 with a certain gap.

In particular in this embodiment, the head 12 is a composite magnetic head having a write element (write head) and a read element (read head) which are formed integrally on the slider 16. By the write head, an electric signal is converted to a magnetic field according to the data to be written to the magnetic disk. By the read head, a magnetic field from the magnetic disk is converted to an electric signal. The head 12 is configured so that the write head reaches each sector earlier than the read head. The configuration of this composite magnetic head will be described later. Note that either one or plural magnetic disks 11 may be contained in the HDD 1. In addition, a recording surface may be formed on either one or both sides of the magnetic disk 11.

Turning back to FIG. 1, each circuit section is described below. For data access, the AE 13 chooses one head 12 from the plural heads 12. A signal retrieved by the read head of the selected head 12 is pre-amplified in the AE 13 by a certain amount of gain. The pre-amplified read signal is sent to the R/W channel 21. In addition, a write signal from the R/W channel is sent to the write head of a selected head 12.

The R/W channel 21 executes write processing on the data transferred from the host 25. In addition, when data is supplied to the host, the R/W channel 21 executes read processing. In the write processing, the R/W channel 21 code-modulates the write data supplied from code-modulate and further converts the code-modulated write data to a write signal (current) for supply to the AE 13. In the read processing, the R/W channel 21 amplifies the read signal supplied from the AE 13 to a certain level of amplitude, extracts data from the obtained read signal and decodes the data. The read data comprises user data and servo data. The decoded read data is supplied to the HDC/MPU 23.

The HDC/MPU 23 is a single chip circuit where a MPU and a HDC are integrated to each other. The MPU operates according to microcodes loaded into the RAM 24. When the HDD 1 is started, not only microcodes which are to run on the MPU but also data required for control and data processing are loaded into the RAM 24 from the magnetic disk 11 or a ROM (not shown in the figure). In addition to positioning control of the heads 12, interface control and operations required for such data processing as defect management, the HDC/MPU 23 executes general control of the HDD 1. In particular, the HDC/MPU 23 in this embodiment generates a write servo gate and a read servo gate to control the timing of reading servo data for write and read operations respectively. This will be described later in detail.

Through an interface function provided for the host 25, the HDC/MPU 23 receives user data and commands such as read and write commands sent from the host 25. The received user data is transferred to the R/W channel 21. In addition, the HDC/MPU 23 obtains read data from the magnetic disk via the R/W channel 21 and transmits the read data to the host 25. Further, the HDC/MPU 23 executes ECC processing on the user data obtained from the host 25 or read from the magnetic disk 11. The HDD 1 of this embodiment sends and receives data (including commands, user data and control data) to and from the host 25 through serial communication. Thus, a characteristic control sequence is executed in a power-save mode. This will be described later in detail.

Data read out by the R/W channel 21 includes servo data as well as user data. By using the servo data, the HDC/MPU 23 performs positioning control of the heads 12. The HDC/MPU 23 outputs control data to the motor driver unit 22. Depending on the control signal, the motor driver unit 22 supplies drive current to the VCM 15. In addition, the HDC/MPU 23 uses the servo data to control the data read/write processing.

Figure 3:
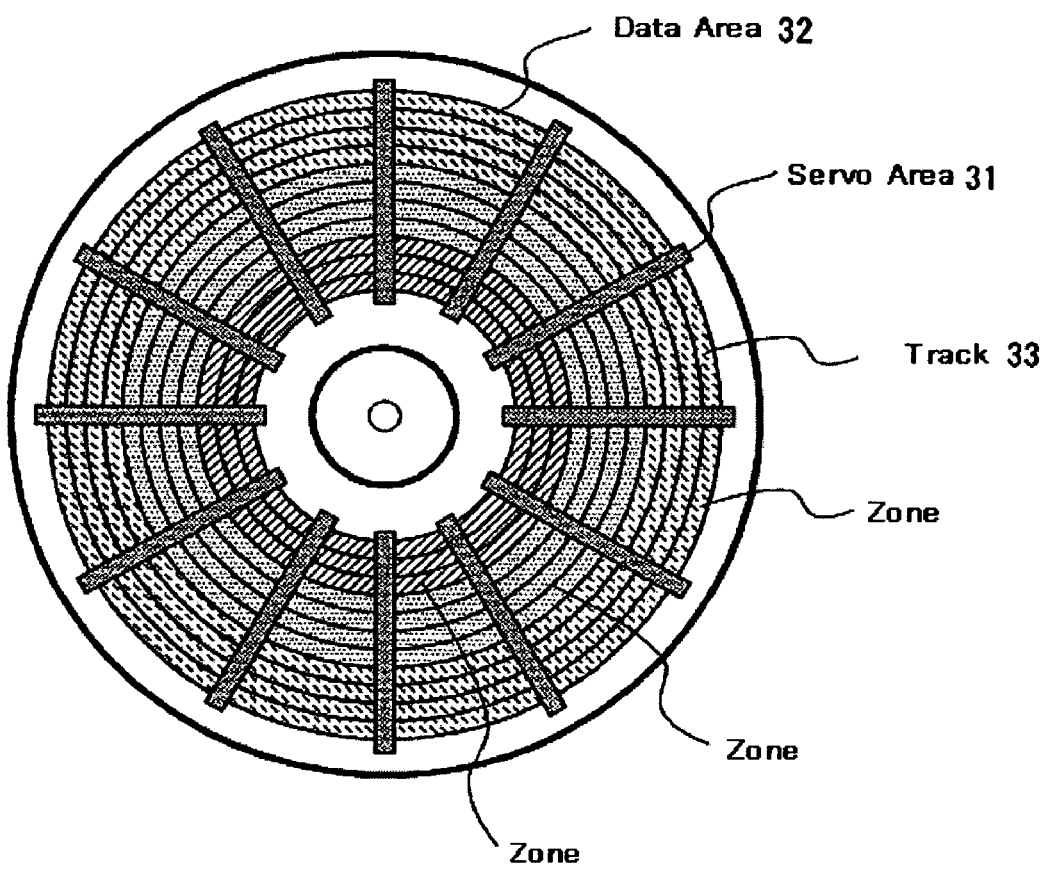
FIG. 3 schematically shows how data are recorded in a recording surface of the magnetic disk in the embodiment of the present invention.

FIG. 3 schematically shows how data is recorded in a recording surface of the magnetic disk 11. As shown in FIG. 3, a plurality of servo areas 31 are formed in the recording surface of the magnetic disk 11 at fixed angular intervals so as to radially extend from the center of the magnetic disk 11. A data recording area 32 is formed between two mutually adjacent servo areas 31. The servo areas 31 and the data recording areas 32 are alternately formed at fixed angles. In each servo area 31, servo data for controlling the position of the head 12 is recorded. In each data recording area 32, user data is recorded.

In addition, a plurality of concentric tracks 33 are formed in the recording surface of the magnetic disk 11. Each track has a fixed width in the radial direction. Servo data and user data are recorded along these tracks 33. Part of each track between servo areas 31 has a plurality of data sectors (user data recording units). In addition, each track 33 is grouped into a plurality of zones depending on the radial position on the magnetic disk 11. The number of sectors in one track is set according to which zone the track is grouped into. In FIG. 3, three zones are shown as an example. By changing the recording frequency on an each zone basis, it is possible to raise the recording density.

Figure 4:
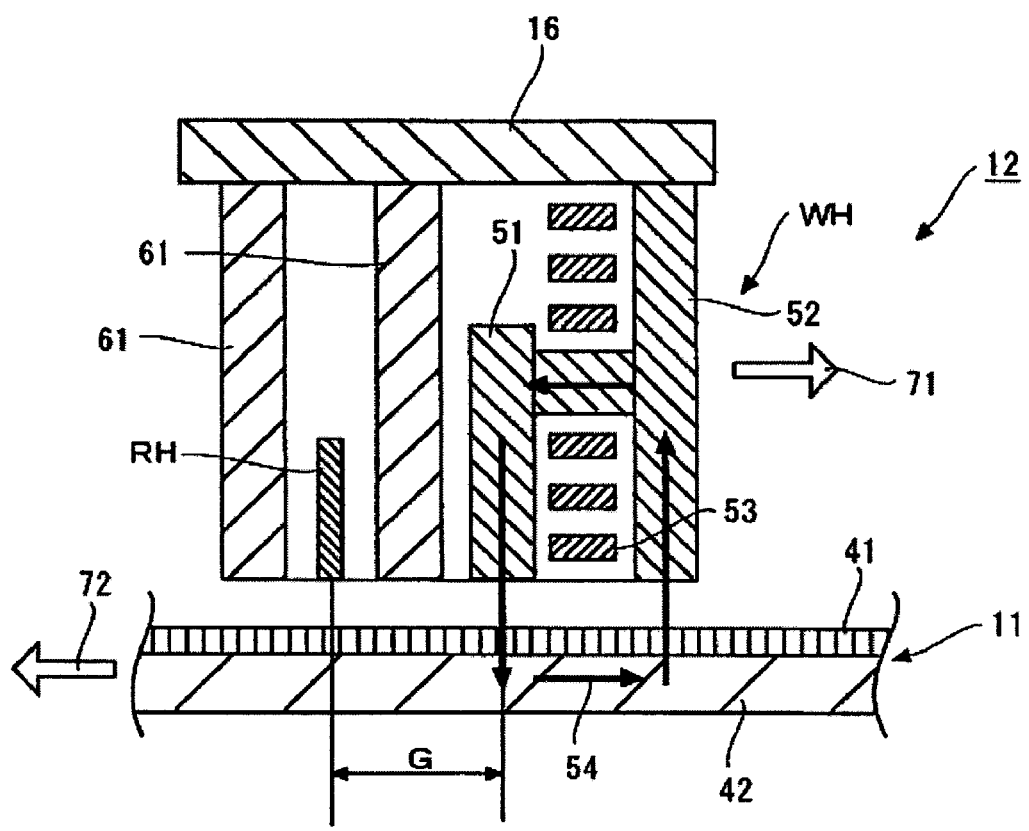
FIG. 4 schematically shows the composite magnetic head in the embodiment of the present invention.

FIG. 4 schematically shows the composite magnetic head in this embodiment. Although the following description is made on the assumption that perpendicular magnetic recording is employed in the magnetic disk drive, it is needless to say that the present invention may also be applicable to a longitudinal recording magnetic disk drive in which the surface of the disk 11 is magnetized in the track direction (in-plane direction) for recording.

The magnetic disk 11 has a perpendicular recording layer 41 which is magnetized in a direction perpendicular to the disk surface and a highly permeable soft magnetic layer (high permeability layer) 42 which is formed under the perpendicular recording layer 41.

The composite magnetic head 12 has a write head WH and a read head RH on the slider 16 and is positioned above the perpendicular recording layer 41 of the magnetic disk 11. The write head WH is a single-pole head comprising: a single pole piece 51 composed of a highly permeable magnetic thin film; a return magnetic pole piece 52 to constitute a magnetic circuit; and a recording coil 53 to generate a magnetic field. Arrows 54 indicate a flow of magnetic flux. The read head RH is composed of, for example, a GMR element surrounded by a magnetic shield 61 and is formed at a given distance from the write head WH.

In FIG. 4, an arrow 71 indicates the direction of movement of this composite magnetic head 12 relative to the magnetic disk 11 whose direction of rotation is indicated by an arrow 72. That is, this composite magnetic head 12 is structured so that the write head WH reaches each servo area earlier than the read head RH. Its head gap G is the space (distance) between the write head WR and the read head RH in the track direction.

In this magnetic disk drive of the embodiment structured so that the write head WH reaches each servo area earlier than the read head RH as mentioned above, the servo gate timing is changed depending on whether the operation is write or read. Note that a composite magnetic head structured in this manner is described in Japanese Patent Laid-open No. 2003-281701. This reversed arrangement of the read and write heads allows the composite head to immediately read a recorded signal in order to check if the signal is properly recorded.

In the present embodiment, a composite magnetic head is used which is structured so that the write head reaches each servo area earlier than the read head and the write operation timing and the read operation timing are controlled individually. This makes it possible to attain improved raised recording efficiency since it is possible to utilize an area that immediately follows the servo area and conventionally is not recordable (hereinafter denoted as an unrecordable area). The following describes this embodiment in more detail. FIG. 5(a) is provided to explain how data are arranged in connection with the heads in the magnetic disk drive of this embodiment. FIG. 5(b), FIG. 5(c), FIG. 5(d) and FIG. 5(e) are provided to explain the write servo timing, write gate timing, read servo gate timing and read gate timing, respectively.

As shown in FIG. 5(a), the servo area 31 and the data recording area 32 are repeatedly formed on a track. Servo data recorded in the servo area 31 comprises: common servo data SP which is used both during write and during read; write servo data SW which is used during write; and read servo data SR which is used during read.

Common servo data SP includes: sync data for data synchronization; a servo mark to indicate the start of the servo data; position information such as cylinder, track and servo sector identifiers; and servo patterns to indicate the position of the head relative to the track. The sync data includes servo AGC used to adjust the gain of the signal amplifier before reading out of the servo data so as to regulate the amplitude to a certain level.

Write servo data SW is used during write operation. It includes a synchronization signal used to secure track following during write operation even if repeatable runout (PRO) occurs in synchronization with the rotation of the spindle motor which drives the disk to rotate. Likewise, read servo data SR is used during read operation and includes a synchronization signal.

After common servo data SP is recorded, write servo data SW and read servo data SR can be written individually as information unique to the magnetic disk drive. In this case, if the bit assignment which follows the sync data of common servo data SP for the write servo data SW and the read servo data SR is predefined, it is possible to recognize which servo data in the read head RH is being read out by the read head RH based on the magnitude of the head gap G between the write head WH and the read head RH, position information of the heads relative to the disk, and the current count of bits after the sync data.

During write in the magnetic disk drive of the embodiment, data recording is executed after common servo data SP and write servo data SW are read out from a servo area. That is, write operation is started immediately after the write servo data SW is read out by the read head RH without reading the read servo data SR which is not used during write. This means that write operation is started at an earlier timing than in a conventional drive. In a conventional drive, an unrecordable area whose width is equal to the head gap is formed between the servo area 31 and the data sector d1. In the case of the magnetic disk drive of the embodiment, the corresponding unrecordable area occurs between the write servo data SW and the data sector d1. In this embodiment, the data-unrecordable area between the read servo data SW and the data sector d1 can be reduced by a width which is equal to the read servo data SR.

In comparison with conventional magnetic disk drives, the following describes the advantage of this embodiment. FIGS. 6 and 7 each correspond to FIG. 5. FIG. 6 concerns a conventional magnetic disk drive whose composite magnetic head is structured so that the write head WH reaches each servo area earlier than the read head RH. FIG. 7 is for another conventional magnetic disk drive whose composite magnetic head is structured so that the read head RH reaches each servo area earlier than the write head WH.

Like in the present embodiment, the composite magnetic head of the former conventional magnetic disk drive is structured so that the write head WH reaches each servo area 31 then the read head RH as shown in FIG. 6. As shown in FIG. 6(*b*) and FIG. 6(*d*), however, the servo gate control is uniform regardless of whether the operation is written or read. That is, not only during read operation but also during write operation, recording is executed after the common servo data, write servo data SW and read servo data SR included in the servo area is all read. Thus, the resulting unrecordable area 134*a* is wider than at least the head gap G of the composite magnetic head.

Note that practically, a gap field is formed between the servo area 31 and the data recording area 32 due to the delay of switching from servo data read operation to user data write operation and the necessity to absorb rotational fluctuations. As mentioned earlier, there are known techniques to raise the format efficiency by minimizing such a gap field. In contrast, the present embodiment proposes a method which raises the format efficiency by shortening or utilizing the unrecordable area which is inevitably formed in conventional drives as an area wider than at least the head gap G.

Figure 5:
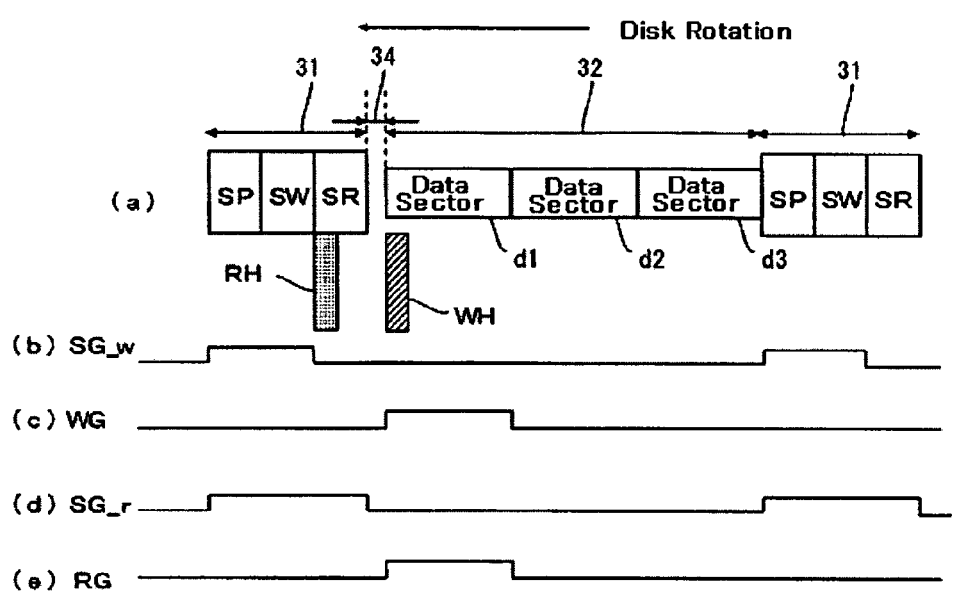
FIG. 5(a) is provided to explain the relationship between the data arrangement and the head in the magnetic disk drive according to the embodiment of the present invention and FIGS. 5(b), (c), (d) and (e) are provided to explain the write servo gate timing, write gate timing, read servo gate timing and the read gate timing, respectively.
Figure 6:
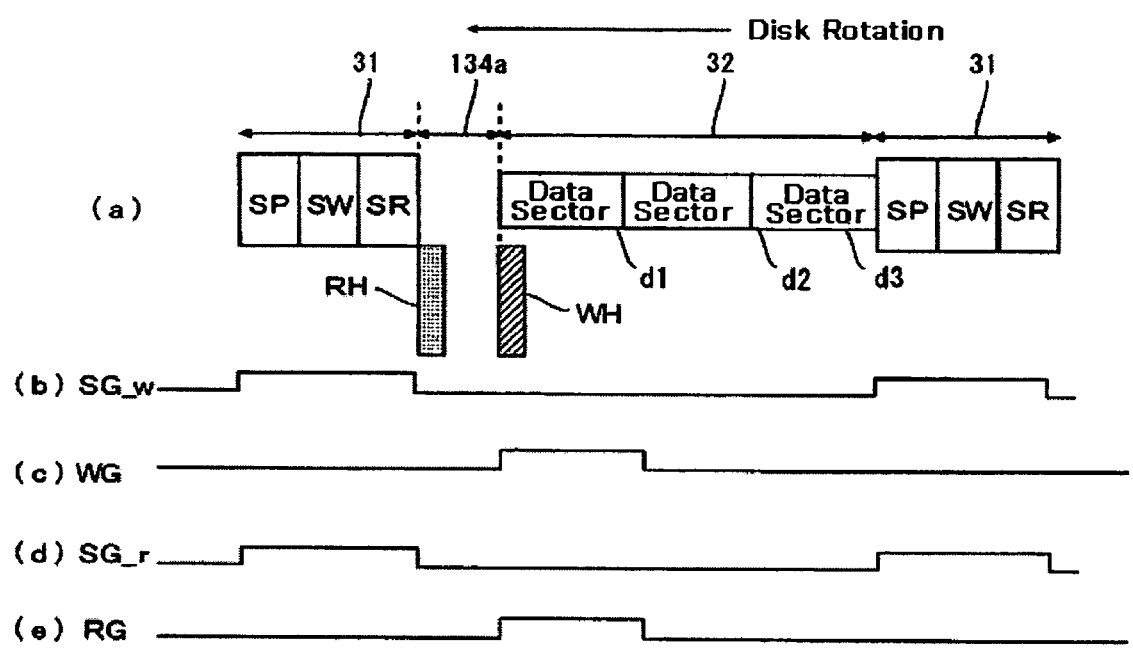
FIG. 6 is provided to explain an unrecordable area left in a prior art magnetic disk drive where a composite magnetic head structured so that the write head WH reaches each servo area earlier than the read head RH is employed and SG_w shows a conventional waveform.
Figure 7:
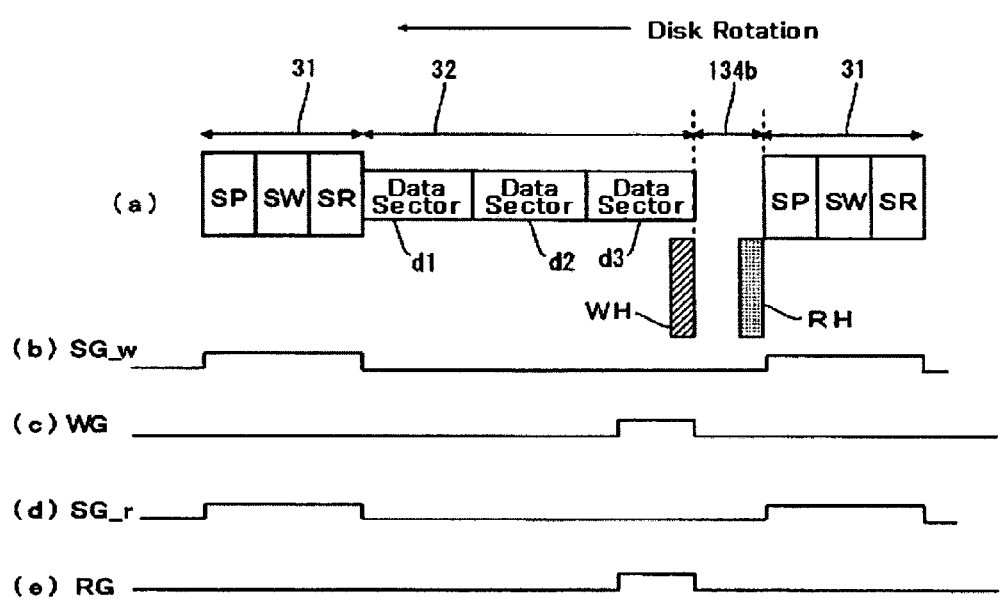
FIG. 7 is provided to explain an unrecordable area left in a prior art magnetic disk drive where a composite magnetic head structured so that the read head RH reaches each servo area earlier than the write head WH is employed.
Figure 8:
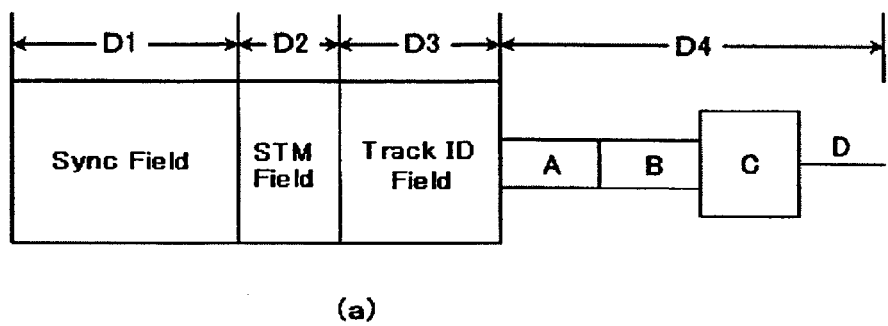
FIG. 8(a) schematically shows an example of conventional servo data and FIG. 8(b) is provided to explain conventional seamed bursts A, B, C and D.
Figure 8:
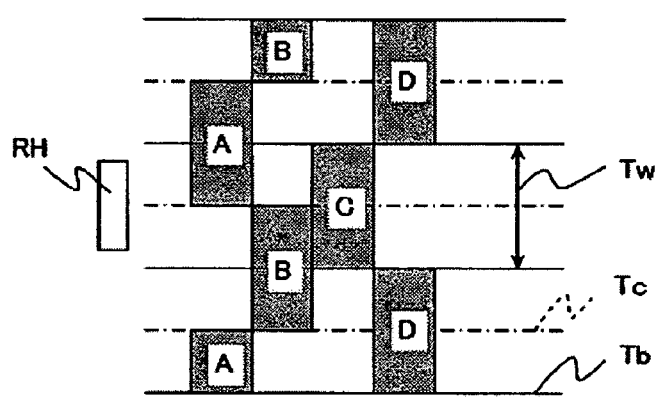

To simplify the description, the above-mentioned gap field is not shown in FIGS. 5 through 7. Also note that as shown in FIGS. 5 and 6, if the composite magnetic head is structured so that the write head WH reaches each servo area earlier than the read head RH, no unrecordable area is formed between the last data sector d3 in the data recording area 32 and the servo area 31 since the read head RH reaches the servo area later than the write head WH. Reversely, if the composite magnetic head is structured so that the read head RH reaches each servo area earlier than the write head WH, no unrecordable area is formed between the servo area 31 and the first data sector d1 in the data recording area 32 as shown in FIG. 7.

In the case of the conventional HDDs, the unrecordable area 134*a* or 134*b* formed between the servo area 31 and the data recording area 32 is wider than at least the head gap G of the composite magnetic head. In FIG. 6, the unrecordable area 134*a* formed between the servo area 31 and the data recording area 32 is wider than at least the head gap G of the composite magnetic head since data recording is started after the servo data are all read out although the head RH reaches the servo area 31 later than the write head WH.

In FIG. 7, the composite magnetic head is structured ordinarily so that the read head RH reaches each servo area 31 earlier than the write head WH. Also in this case, the unrecordable area 134*b* formed between the servo area and the data recording area also corresponds in size to the head gap.

In the case of the present embodiment, servo data is recorded in each servo area by using a composite magnetic head structured as shown in FIG. 4 so that common servo data SP, write servo data SW and read servo data RW can be read out sequentially in this order by the read head RH. During write operation, immediately after the write servo data is read out, the magnetic disk drive turns OFF the servo gate (write servo gate SG_w in FIG. 5(*b*)) and ON the write gate (write gate WG in FIG. 5(*c*)) to start data recording by the write head WH without reading the read servo data by the read head RH. While the formed unrecordable area 134*a* is conventionally wider than at least the head gap G as shown in FIG. 6, therefore, the unrecordable area 34 can be provided which is reduced by the width of the read servo data SR, resulting in an improved format efficiency.

As shown in FIG. 7, if an ordinary composite magnetic head is used, an unrecordable area 134*b* corresponding to the unrecordable area in FIG. 6 is formed not between the servo area 31 and the data recording area 32 but between the data recording area 32 and the servo area 31. Since each servo area must be arranged so that common servo data SP is read out first by the read head RH, the unrecordable area 134*b* cannot be made narrower than the head gap G even if write servo data SW is interchanged with read servo data SR.

In the present embodiment, the write servo gate SG_w and the write gate WG can be controlled by the MPU (see FIG. 1). Based on the size of the head gap G, the number of bits from the sync data of common data SP to the end of the write servo data in the servo area, the number of bits from that sync data to the end of the read servo data, the current head position and other information, the MPU controls the servo gate and write gate timings.

During read, the MPU controls the read servo gate SG_r and the read gate RG as shown in FIG. 5(*d*) and FIG. 5(*e*). Thus, after the read servo data is all read out, data sectors d1 through d3 are read out in the same manner as in the conventional magnetic disk drives shown respectively in FIG. 6 and FIG. 7.

As described above, the MPU controls the write servo gate timing differently from the read servo gate timing. During write, since write operation is started without reading unnecessary read servo data, read servo data can be placed in the area 134*a* which is conventionally left as an unrecordable area. This results in improved format efficiency.

In the present embodiment, common servo data SP, write servo data SW and read servo data RS are all recorded in advance. It enlarges the data-recorded area and therefore raises the format efficiency by starting write operation without reading read servo data during write. Also in the case of a disk where both write servo data and read servo data are not recorded in advance, the present invention allows addition of read servo data in the servo area to raise the track following performance without lowering the format efficiency. This is because read servo data SR can be recorded in the conventionally unrecordable area 134*a* instead of in the data recording area. In addition, adding two kinds of servo data, write servo data and read servo data, does not require more than enlarging the servo area by the write servo data.

Also in this case, common servo data SP, write servo data SW and read servo data RW are recorded so that these servo data can be read in this order as described earlier. The servo gate, write gate and read gate timings are controlled by the MPU so as to start data write immediately after the write servo data SW is read during write and start data read after the servo data is all read during read. This makes the unrecordable area not wider than the head gap.

Note that the present invention is not limited to the embodiment described so far, but encompasses a variety of modifications which will become possible without departing from the spirit of the invention. For example, the individual circuits may be integrated either as a single circuit or as a plurality of separate circuits. In addition, while in the aforementioned embodiment, both read servo data and read servo data are recorded in the servo area, the present invention can also be applied to a drive where only read servo data is recorded.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A disk drive comprising:
    a head provided with a write head to record data on a disk and a read head to read out data recorded on the disk; and
    a read write control unit which controls the write and read done by the head;
    wherein the disk has servo areas in each of which common servo data to be used both during write and during read, and read servo data to be used during read, are recorded;
    wherein the common servo data including sync data for synchronization and the read servo data including a synchronization signal are recorded in each servo area in such a manner that the read servo data is read after the common servo data;
    wherein the head is structured in such a manner that the write head reaches each servo area earlier than the read head when data is recorded in data recording areas each of which are arranged between adjacent servo areas; and
    wherein the read write control unit starts the write head recording data in a data recording area before the read head reads out read servo data from the servo area.

2. A disk drive according to claim 1, wherein a gap between the write head and the read head in a circumferential direction of the disk is larger than a circumferential width of each area where read servo data is recorded.

3. A disk drive according to claim 1, wherein a write servo gate used during write to control the timing of retrieving servo data recorded in each servo area and a write servo gate used during read to control the timing of retrieving servo data recorded in each servo area are generated differently from each other by the read write control unit.

4. A disk drive according to claim 1, wherein a gap between the write head and the read head in a circumferential direction of the disk is larger than a circumferential width of each area where read servo data is recorded.

5. A disk drive according to claim 4, wherein a write servo gate used during write to control the timing of retrieving servo data recorded in each servo area and a write servo gate used during read to control the timing of retrieving servo data recorded in each servo area are generated differently from each other by the read write control unit.

6. A disk drive according to claim 1, wherein a write servo gate used during write to control the timing of retrieving servo data recorded in each servo area and a write servo gate used during read to control the timing of retrieving servo data recorded in each servo area are generated differently from each other by the read write control unit.

7. A disk drive according to claim 1, wherein the read write control unit generates a write gate in such manner that data recording in each data area is started at the timing when common data is completely retrieved.

8. A disk drive according to claim 1, wherein write servo data to be necessary during write is also recorded in each servo area in such a manner that the common servo data, the write servo data and the read servo data are read in order.

9. A disk drive according to claim 8, wherein the read write control unit generates a write gate in such a manner that data recording in each data area is started at the timing when write servo data is completely retrieved.

10. A disk drive according to claim 8, wherein a gap between the write head and the read head in a circumferential direction of the disk is larger than a circumferential width of each area where read servo data is recorded.

11. A disk drive according to claim 10, wherein a write servo gate used during write to control the timing of retrieving servo data recorded in each servo area and a write servo gate used during read to control the timing of retrieving servo data recorded in each servo area are generated differently from each other by the read write control unit.

12. A disk drive according to claim 8, wherein a write servo gate used during write to control the timing of retrieving servo data recorded in each servo area and a write servo gate used during read to control the timing of retrieving servo data recorded in each servo area are generated differently from each other by the read write control unit.

13. A disk drive according to claim 1, wherein a write servo gate used during write to control the timing of retrieving servo data recorded in each servo area and a write servo gate used during read to control the timing of retrieving servo data recorded in each servo area are generated differently from each other by the read write control unit.

14. A disk drive comprising:
    a disk having servo areas in each of which common servo data including sync data for synchronization to be used both during write and during read is recorded;
    a write head to record data signal in data recording areas on the disk;
    a read head which is provided circumferentially apart from the write head to read out data signal recorded in data recording areas on the disk; and
    a read write control unit which controls the write and read done by the heads;
    wherein, on the disk, read servo data including a synchronization signal to be used at least during read is provided in each servo area between the common servo data and the adjacent data area so that the read servo data is retrieved by the read head later than the common servo data; and
    wherein the read write control unit starts the write head recording data in a data recording area before the read head retrieves read servo data from the servo area.

15. A disk drive according to claim 14, wherein the gap between the write head and the read head is larger than the circumferential width of each area where read servo data is recorded.

16. A control method for a disk drive having a write head to record data in data recording areas on a disk and a read head to retrieve data recorded in data recording areas on the disk and a read write control unit to control the write and read done by the heads, said control method comprising:
    allowing the read head to read common servo data including sync data for synchronization from the disk in which in each of servo areas arranged thereon, the common servo data to be used both during write and during read and read servo data including a synchronization signal to be used during read are recorded in such a manner that the common servo data is read out earlier than the read servo data; and allowing the write head to start data recording in each data recording area before the read servo data is retrieved.

17. A control method for a disk drive according to claim 16, further comprising:

reading the common servo data and write servo data from the disk in which the write servo area to be used during write is recorded in each servo area; and allowing the write head to start the data recording in each data recording area after the write servo data is retrieved but before the read servo data is retrieved.

18. A control method for a disk drive according to claim 17, wherein reading data by the read head from each recording area is started after all servo data are retrieved from the servo area.

19. A control method for a disk drive according to claim 17, wherein reading data by the read head from each recording area is started after the common servo data and the read servo data are retrieved.

20. A control method for a disk drive according to claim 19, wherein reading data by the read head from each recording area is started after all servo data are retrieved from the servo area.

21. A control method for a disk drive according to claim 16, wherein reading data by the read head from each recording area is started after all servo data are retrieved from the servo area.

* * * * *